US012472514B2

(12) United States Patent
Hu et al.

(10) Patent No.: US 12,472,514 B2
(45) Date of Patent: Nov. 18, 2025

(54) SHOWER HEAD WITH AUTOMATICALLY RESETTABLE SPRAY GUN

(71) Applicant: XIAMEN DELMEI SANITARY WARE CO., LTD., Xiamen (CN)

(72) Inventors: Yunan Hu, Ganzhou (CN); Chunhua Wang, Xiamen (CN); Changzheng Ni, Xiamen (CN); Yongqiang Yan, Fuzhou (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 281 days.

(21) Appl. No.: 18/362,986

(22) Filed: Aug. 1, 2023

(65) Prior Publication Data

US 2024/0399392 A1 Dec. 5, 2024

(30) Foreign Application Priority Data

Jun. 1, 2023 (CN) ......................... 202310641456.5
Jun. 1, 2023 (CN) ......................... 202321370425.2

(51) Int. Cl.
*B05B 1/18* (2006.01)
*B05B 1/16* (2006.01)
*B05B 1/30* (2006.01)
*B05B 12/00* (2018.01)

(52) U.S. Cl.
CPC .............. *B05B 1/18* (2013.01); *B05B 1/1663* (2013.01); *B05B 1/30* (2013.01); *B05B 12/002* (2013.01)

(58) Field of Classification Search
CPC ....... B05B 1/1636; B05B 1/1663; B05B 1/18; B05B 1/30; B05B 1/3026; B05B 12/002; B05B 3/04
See application file for complete search history.

(56) References Cited

U.S. PATENT DOCUMENTS 5,383,604 A * 1/1995 Boesch ................. B05B 1/1618 239/447
2021/0129162 A1* 5/2021 Quinn ....................... B05B 1/18
2022/0143630 A1* 5/2022 Hong ........................ B05B 1/18

FOREIGN PATENT DOCUMENTS

CN 110841812 A * 2/2020 ............ B05B 15/50
CN 210753274 U * 6/2020

OTHER PUBLICATIONS

English Translation CN210753274 Inventor: He Huihui (Year: 2020).*

* cited by examiner

*Primary Examiner* — Jesse S Bogue

(57) ABSTRACT

A shower head with automatically resettable spray gun includes a shower head body including a water passage switching mechanism, a shower head, and a spray gun head which respectively communicates with the water passage switching mechanism. The water passage switching mechanism includes a water passing member and a water passage switching unit. The water passing member includes a water inlet, a water passage switching cavity communicating with the water inlet, a shower head water passage and a spray gun water passage which respectively communicates with the water passage switching cavity. The water passage switching unit arranged in the water passage switching cavity includes a button arranged at the water passing member by hinge joint, a switching link rod arranged at a lower portion of the button, and an elastic member connected between the switching link rod and the water passage switching cavity.

8 Claims, 10 Drawing Sheets

SHOWER HEAD WITH AUTOMATICALLY RESETTABLE SPRAY GUN

CROSS-REFERENCE TO RELATED APPLICATIONS

This application is based upon and claims priority to Chinese Patent Application No. 202310641456.5, filed on Jun. 1, 2023 and Chinese Patent Application No. 202321370425.2, filed on Jun. 1, 2023, the entire contents of which are incorporated herein by reference.

TECHNICAL FIELD

The present disclosure relates to a shower head with automatically resettable spray gun.

BACKGROUND

Shower head is an article commonly seen in bathroom. In the prior art, the shower head is usually assembled with a spray gun to realize both water sprays of spray gun and shower head. However, the currently available shower head with spray gun generally has a complex structure and cannot reset automatically, namely, after the use of the spray gun, it cannot automatically return to the shower head mode.

SUMMARY

The present disclosure provides a shower head with automatically resettable spray gun which can effectively address the above problems.

The present disclosure provides the following solutions.

A shower head with automatically resettable spray gun, comprising:

a shower head body, wherein the shower head body includes a water passage switching mechanism, a shower head, and a spray gun head, the shower head and the spray gun head respectively communicates with the water passage switching mechanism; wherein the water passage switching mechanism includes:

a water passing member, wherein the water passing member includes a water inlet, a water passage switching cavity communicating with the water inlet, a shower head water passage, and a spray gun water passage, the shower head water passage and the spray gun water passage respectively communicates with the water passage switching cavity; and a water passage switching unit arranged in the water passage switching cavity, wherein the water passage switching unit includes a button arranged at the water passing member by hinge joint, a switching link rod arranged at a lower portion of the button, and an elastic member connected between the switching link rod and the water passage switching cavity; in an initial water inflow state, the water passage switching cavity communicates the shower head water passage and the water inlet and the switching link rod blocks off the spray gun water passage, by pressing the button, the switching link rod is driven to move and thus blocking off the shower head water passage, and the water passage is switched to a state where the water passage switching cavity communicates with the spray gun water passage, at this time, the elastic member is in a compressed state, and the state is retained under the action of water pressure; when water inflow is finished, since the water pressure is removed, the water passage is automatically switched and reset to the initial state under the action of the elastic member.

The present disclosure has the following advantages: the shower head with automatically resettable spray gun provided by the present disclosure not only has simple structure, but also has the automatic reset function which allows to automatically return to the initial state, thereby greatly improving the user's experience.

BRIEF DESCRIPTION OF THE DRAWINGS

In order to clarify the technical solutions of the implementations of the present disclosure, the drawings used to illustrate the embodiments will be briefly described below. It should be understood that the drawings below merely show some of the embodiments of the present disclosure, and therefore should not be regarded as limits to the scope of the present disclosure. For those of ordinary skill in the art, other related drawings may be derived according to the drawings shown without any creative efforts.

DETAILED DESCRIPTION OF THE EMBODIMENTS

Figure 1:
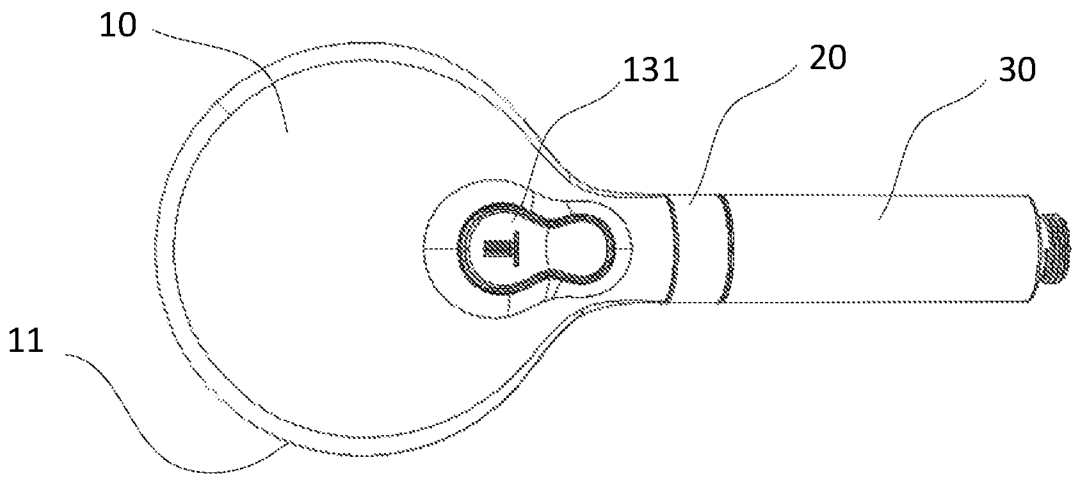
FIG. 1 shows a structural schematic diagram of a shower head with automatically resettable spray gun according to one embodiment of the present disclosure.
Figure 2:
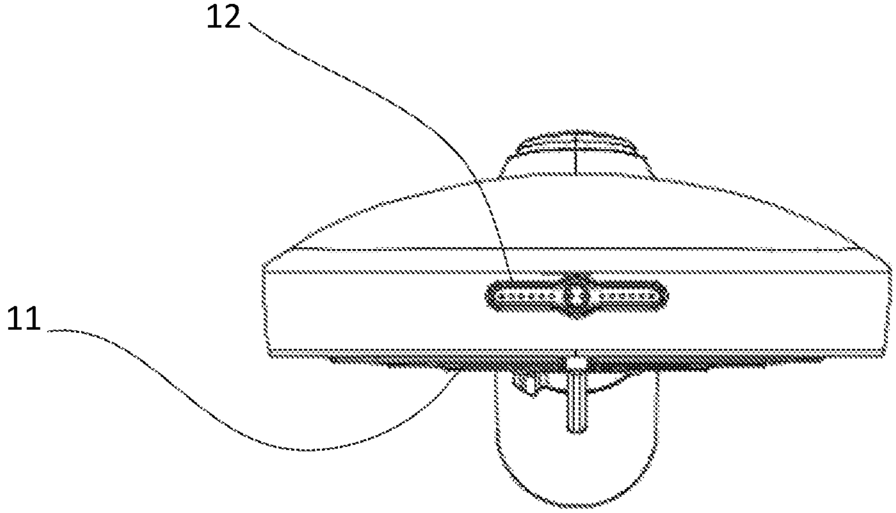
FIG. 2 shows a structural schematic diagram of the shower head with automatically resettable spray gun from another perspective.
Figure 3:
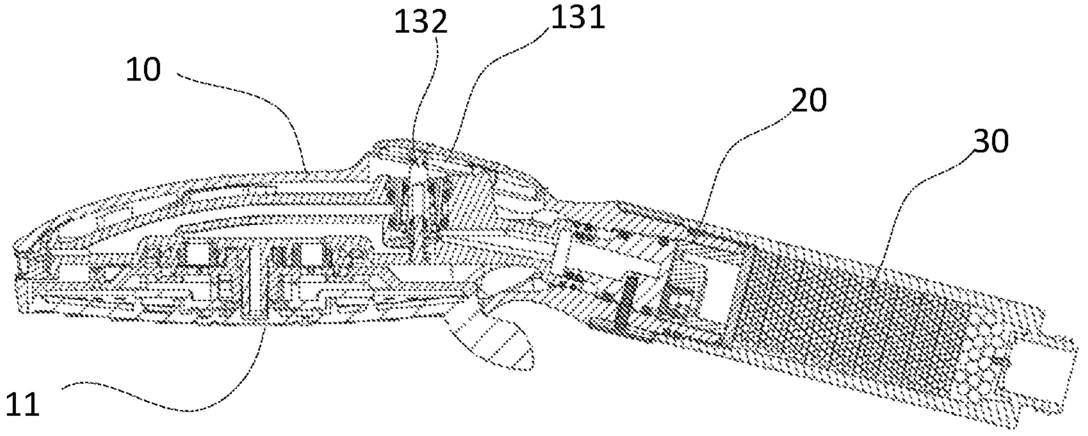
FIG. 3 is a cross-sectional view of the shower head with automatically resettable spray gun according to one embodiment of the present disclosure.
Figure 4:
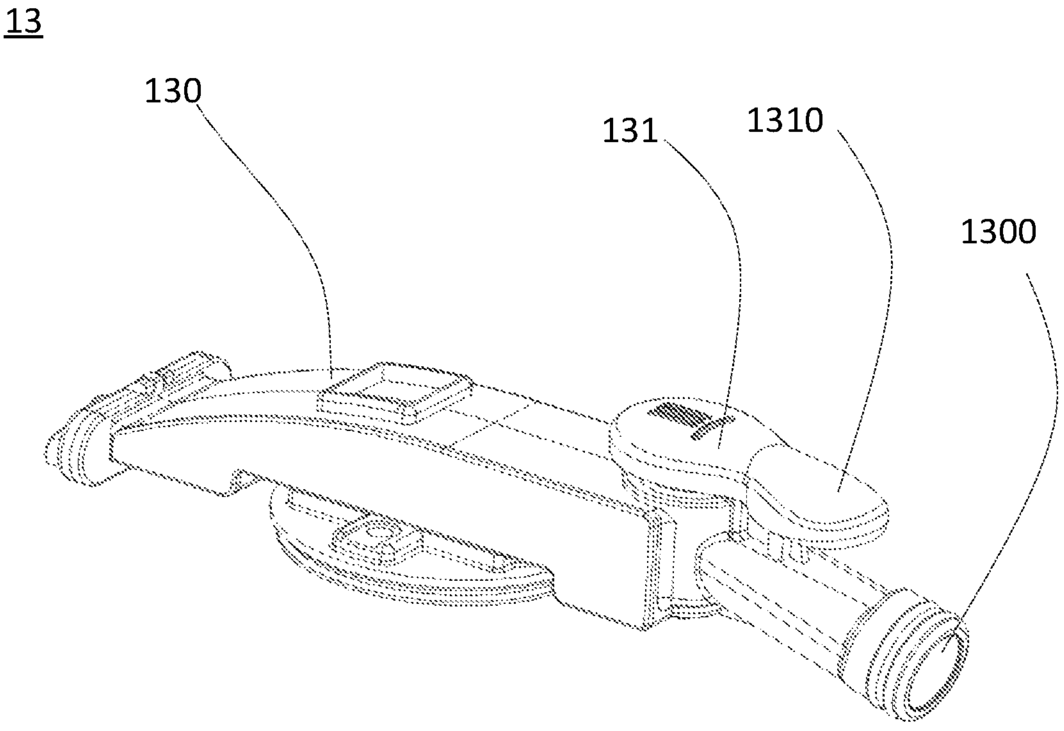
FIG. 4 is a structural schematic diagram showing a water passage switching mechanism of the shower head with automatically resettable spray gun according to one embodiment of the present disclosure.

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure.

In the description of the present disclosure, the terms "first", "second" are used only for descriptive purposes and cannot be understood as indicating or implying relative importance or implying the number of indicated technical features. Thus, a feature that is referred to by "first" and "second" may include, expressly or implicitly, one or more of the features. In the description of the present disclosure, "many" means two or more unless otherwise expressly and specifically defined.

As shown in FIGS. 1-17, the embodiment of the present disclosure provides a shower head with automatically resettable spray gun which includes:

- a shower head body 10;
- a flow rate switching mechanism 20; and
- a handle 30.

The shower head body 10 includes a water passage switching mechanism 13, a shower head 11, and spray gun head 12. The shower head 11 and the spray gun head 12 respectively communicates with the water passage switching mechanism 13.

The water passage switching mechanism 13 includes:

- a water passing member 130 which includes a water inlet 1300, a water passage switching cavity 1301 communicated with the water inlet 1300, a shower head water passage 1302, and a spray gun water passage 1303, the shower head water passage 1302 and the spray gun water passage 1303 respectively communicates with the water passage switching cavity 1301; and
- a water passage switching unit arranged in the water passage switching cavity 1301 for switching water passage between the shower head water passage 1302 and the spray gun water passage 1303.

Figure 5:
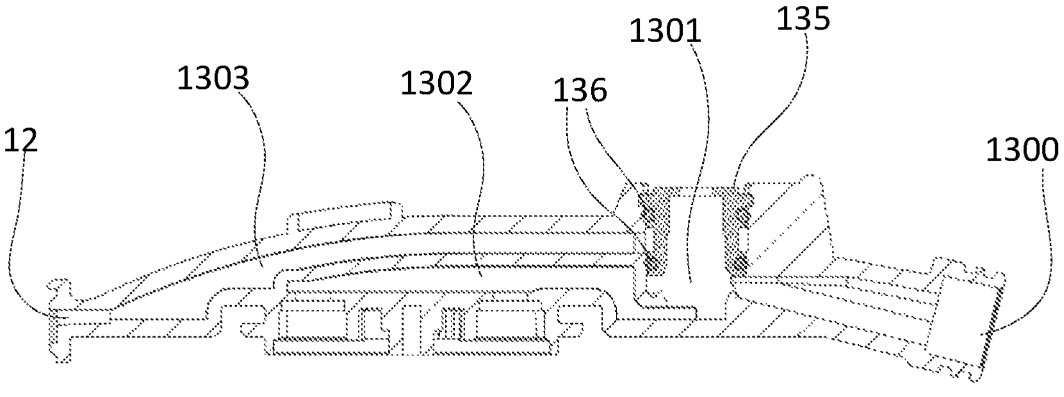
FIG. 5 is a cross-sectional view of the water passage switching mechanism of the shower head with automatically resettable spray gun according to one embodiment of the present disclosure.

The shower head water passage 1302 and the spray gun water passage 1303 respectively communicates with the shower head 11 and the spray gun head 12. The shower head water passage 1302 and the spray gun water passage 1303 may be arranged side by side on the same plane or may be arranged on different planes to achieve layered arrangement. Referring to FIG. 5, according to one embodiment, the shower head water passage 1302 and the spray gun water passage 1303 are arranged on different planes to achieve layered arrangement.

Figure 6:
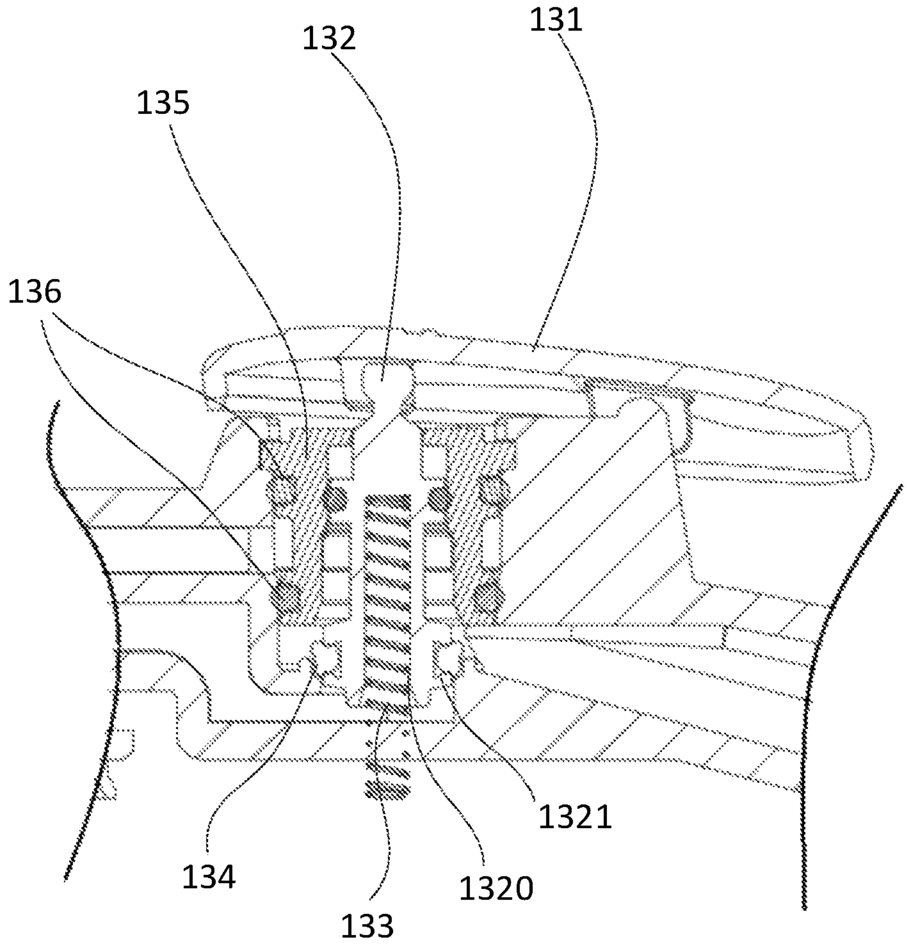
FIG. 6 is a structural schematic diagram showing a part of structure of the water passage switching mechanism of the shower head with automatically resettable spray gun according to one embodiment of the present disclosure.

Referring to FIG. 6, the water passage switching unit includes:

- a button 131 arranged on the water passing member 130 by hinge joint;
- a switching link rod 132 arranged at a lower portion of the button 131;
- an elastic member 133 connected between the switching link rod 132 and the switching cavity 1301.

Figure 7:
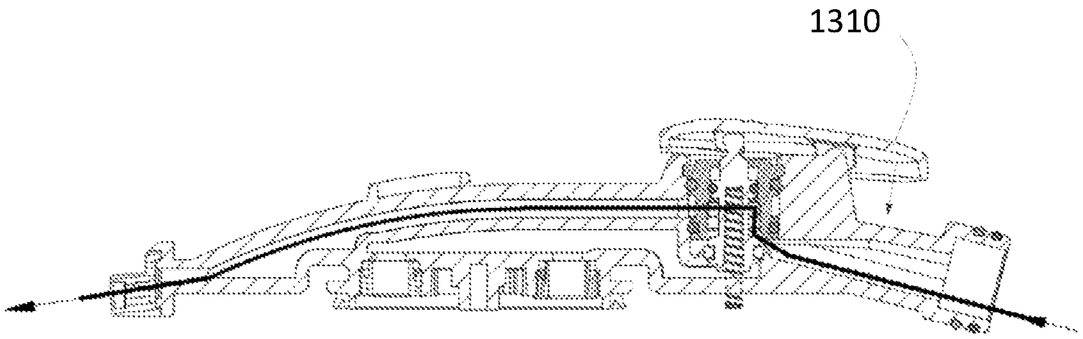
FIG. 7 shows a schematic diagram of the shower head with automatically resettable spray gun according to one embodiment of the present disclosure, in which the shower head is in conduction of a first water passage.
Figure 8:
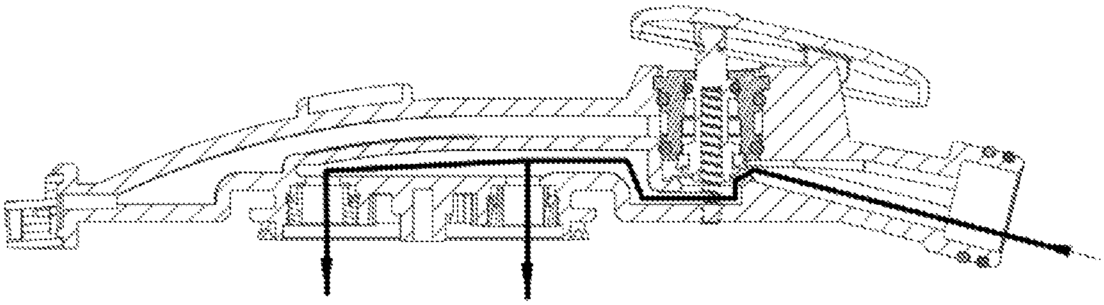
FIG. 8 shows a schematic diagram of the shower head with automatically resettable spray gun according to one embodiment of the present disclosure, in which the shower head is in conduction of a second water passage.
Figure 9:
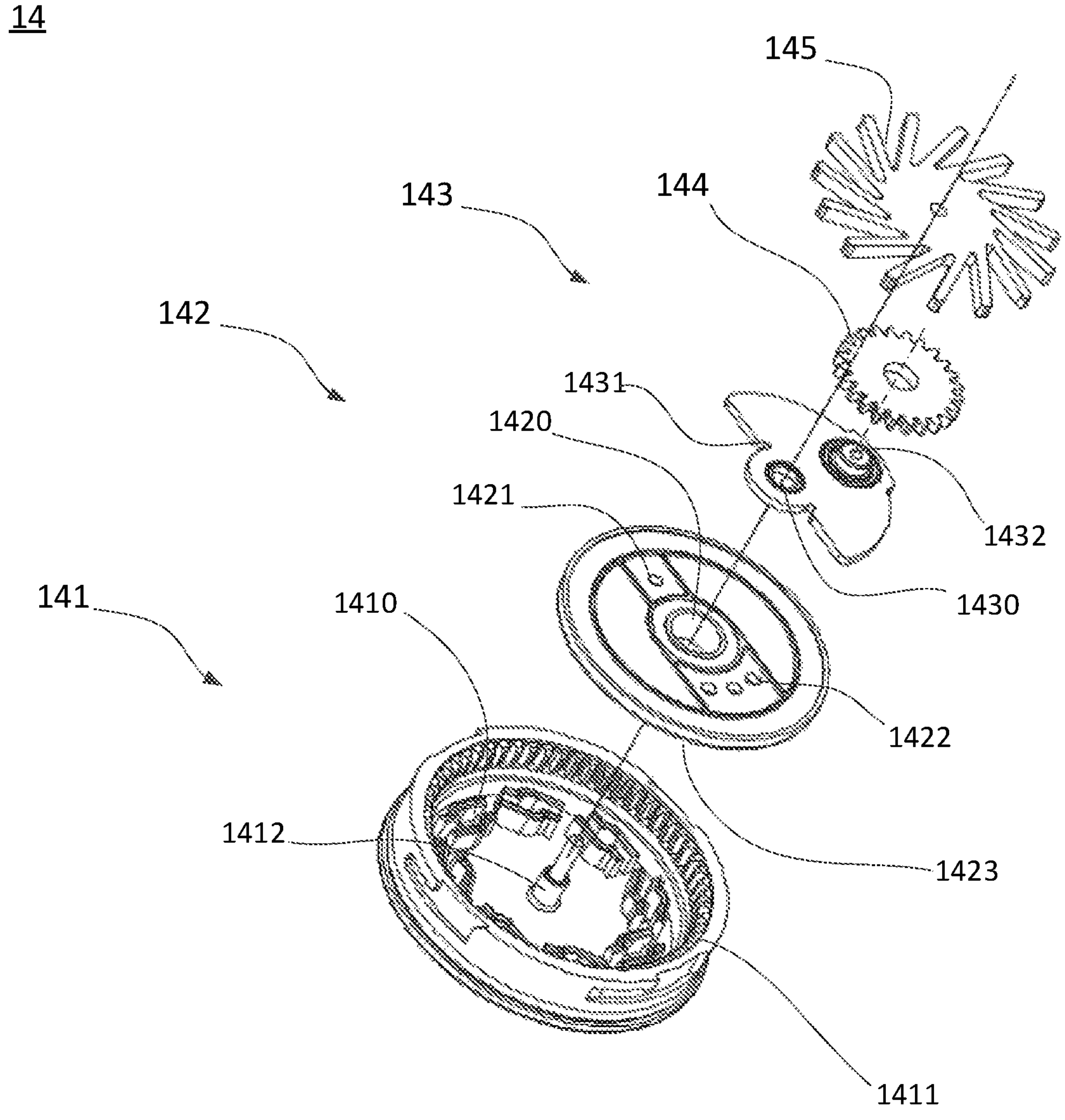
FIG. 9 is a structural schematic diagram of a water outlet mechanism which provides water spray of granular and mist shape of the shower head with automatically resettable spray gun according to one embodiment of the present disclosure.
Figure 10:
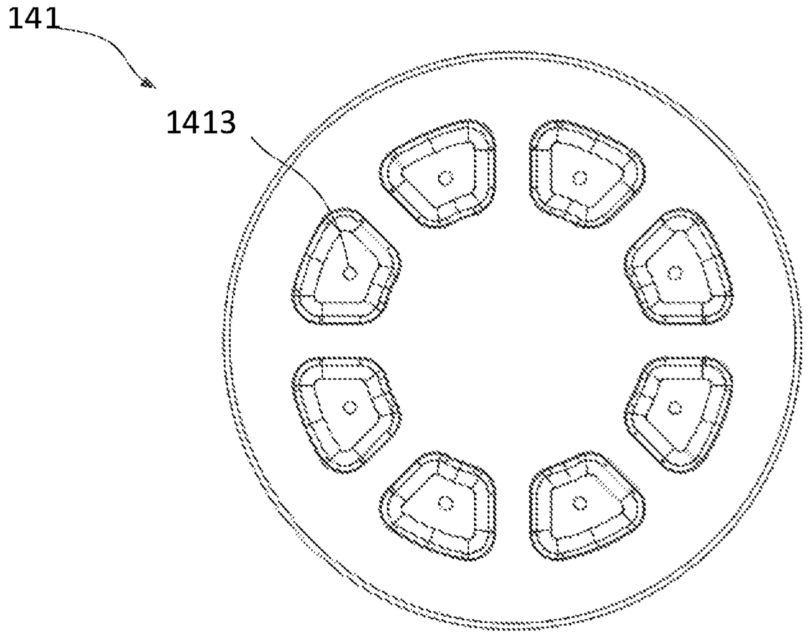
FIG. 10 is a structural schematic diagram showing a part of components of the water outlet mechanism which provides water spray of granular and mist shape of the shower head with automatically resettable spray gun according to one embodiment of the present disclosure.
Figure 11:
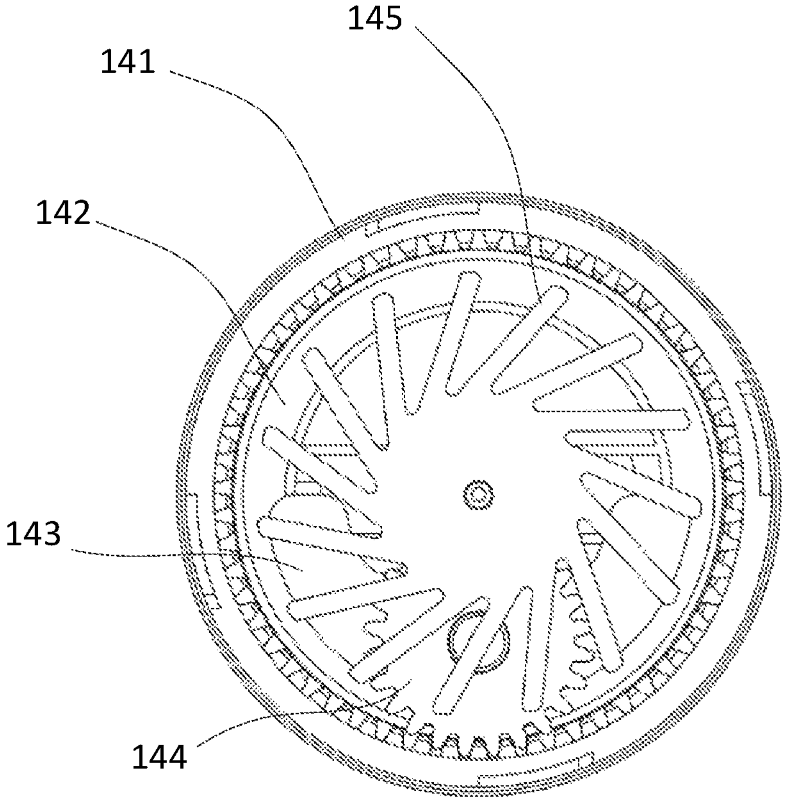
FIG. 11 is a top view of the water outlet mechanism which provides water spray of granular and mist shape of the shower head with automatically resettable spray gun according to one embodiment of the present disclosure.
Figure 12:
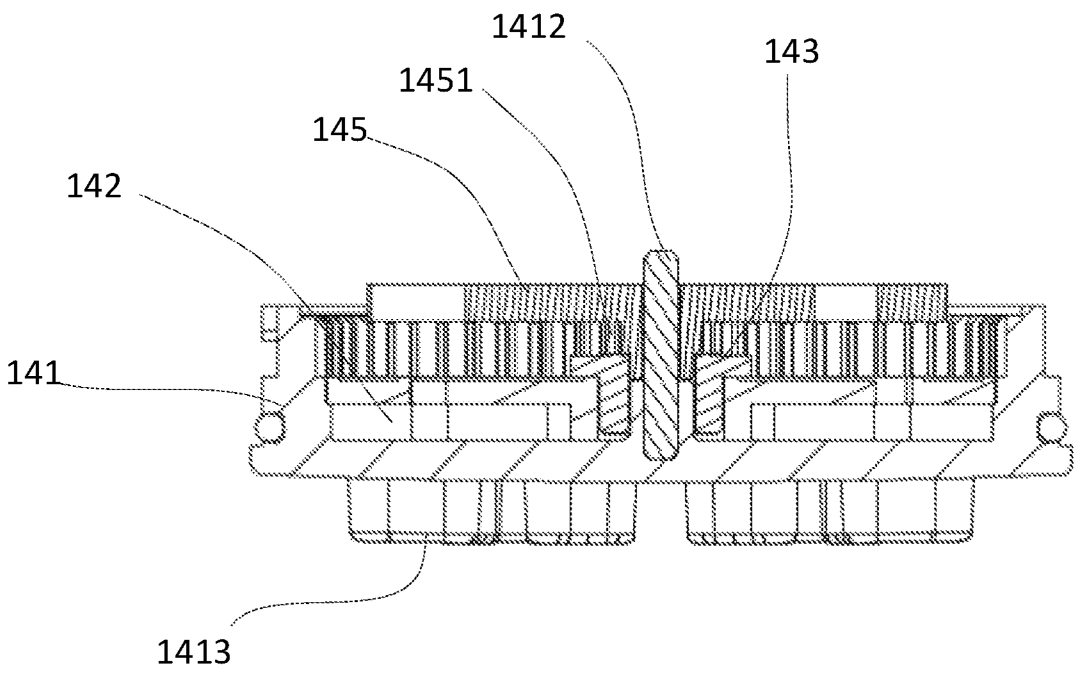
FIG. 12 is a cross-sectional view of the water outlet mechanism which provides water spray of granular and mist shape of the shower head with automatically resettable spray gun according to one embodiment of the present disclosure.
Figure 13:
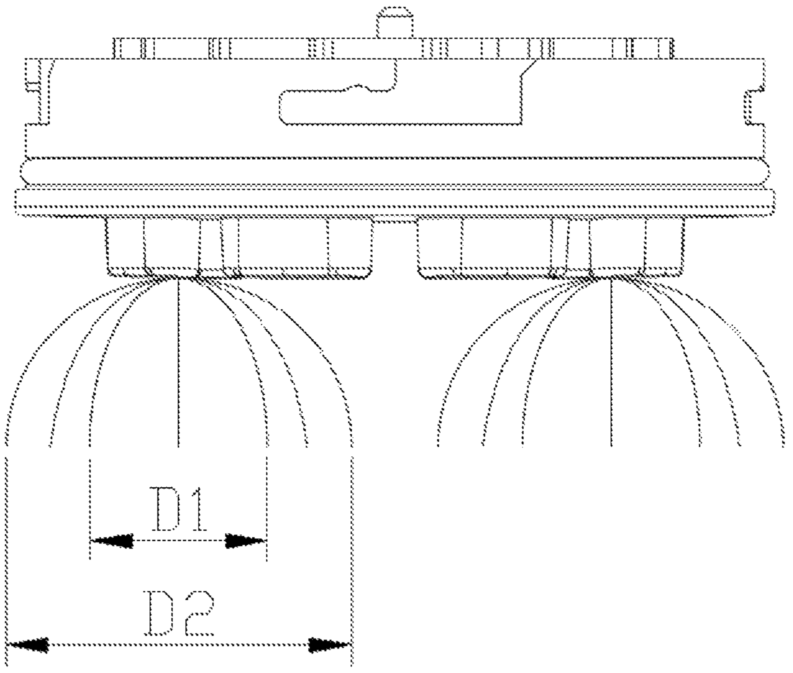
FIG. 13 is a schematic diagram showing different water outflow states of the water outlet mechanism which provides water spray of granular and mist shape of the shower head with automatically resettable spray gun according to one embodiment of the present disclosure.

Referring to FIGS. 7-8, the water passage switching unit can realize automatic reset function. Specifically, under the initial water inflow state, the switching cavity 1301 communicates the shower head water passage 1302 and the water inlet 1300, at this time, the switching link rod 132 blocks off the spray gun water passage 1303. By pressing the button 131, the switching link rod 132 is driven to move downward and block off the shower head water passage 1302, and the water passage is switched to a state where the switching cavity 1301 communicates with the spray gun water passage 1303. At this time, the elastic member 133 is in a compressed state, and the communication state is retained under the action of water pressure. When water inflow is finished, since the water pressure is removed, the water passage is automatically switched and reset to the initial state under the action of the elastic member.

As a further improvement, the button 131 has an extension part 1310 extending reversely, the extension part 1310 is configured to be pressed to switch the water passage to the initial state when the switching cavity 1301 communicates with the spray gun water passage 1303. In other words, the present disclosure not only can realize the automatic reset function after the removal of water pressure, but also can realize passive/manual reset of the water passage during water inflow.

According to one embodiment, the elastic member 133 is a spring. As a further improvement, in other embodiments, in order to further improve the reliability and sealability of the water passage switching, the water passage switching unit may further include:

- a fixation seat 135, wherein the switching link rod 132 is partially arranged in the fixation seat 135 and can move up and down in the fixation seat 135; and
- a first sealing rubber ring 134 arranged on the switching link rod 132 for blocking off the spray gun water passage 1303 or the shower head water passage 1302 in the switching process.

As a further improvement, in other embodiments, a circumference of a bottom portion of the switching link rod 132 is further provided with an engagement groove 1321 for receiving the first sealing rubber ring 134. The engagement groove 1321 may have various shapes and structures which are not limited herein and can be selected according practical needs.

Referring to FIG. 5, as a further improvement, in other embodiments, the water passage switching unit may further include:

second sealing rubber rings 136 arranged between the fixation seat 135 and the switching cavity 1301 for preventing water leakage.

As a further improvement, in other embodiments, the switching link rod 132 further includes a hollow accommodating cavity 1320 for accommodating the elastic member 133. The elastic member 133 is accommodated in the hollow accommodating cavity 1320 for preventing deflection of the elastic member 133.

Referring to FIGS. 9-13, as a further improvement, in other embodiments, the shower head body 10 further includes: a water outlet mechanism 14 which provides water spray of granular and mist shape. The water outlet mechanism 14 communicates with the shower head water passage 1302.

A diameter of water outlet skirt (water spray range) of the water outlet mechanism 14 can be adjusted according to flow rate. The water outlet mechanism 14 specifically includes:

a water outlet body 141, wherein an end surface of the water outlet body 141 is provided with a plurality of water outlet holes 1410 for providing water spray of granular and mist shape, a first rotary shaft 1412 is arranged at the center of the water outlet body 141, and an inner sidewall of the water outlet body 141 is provided with inner gear teeth 1411;

a water passing member 142 sleeved on the first rotary shaft 1412, wherein the water passing member 142 is provided with first water passing hole 1421 and second water passing hole 1422;

a flow rate adjustment plate 143, wherein the flow rate adjustment plate 143 is sleeved on the first rotary shaft 1412 and is attached with the water passing member 142, by rotating the flow rate adjustment plate 143, the covered area of the first water passing hole 1421 and the second water passing hole 1422 can be adjusted, such that the flow rate of the water passing member 142 can be adjusted, the flow rate adjustment plate 143 is provided with a second rotary shaft 1432;

a first gear 144 sleeved on the second rotary shaft 1432, wherein the first gear 144 is engaged with the inner gear teeth 1411; and an impeller 145 sleeved on the first rotary shaft 1412, and the impeller 145 further includes a second gear 1451 arranged around the axis of the impeller 145, the second gear 1451 is engaged with the first gear 144.

When water flow drives the impeller 145 to rotate, the second gear 1451 drives the first gear 144 to rotate, since the first gear 144 and the inner gear teeth 1411 are engaged with each other, the first gear 144 can drive the flow rate adjustment plate 143 to rotate, so as to adjust the covered area of the first water passing hole 1421 and the second water passing hole 1422. Further referring to FIG. 13, when the flow rate adjustment plate 143 covers some of the water passing holes on the water passing member 142, the water passing holes on the other side that are not covered will draw the water flow to the water outlet of the water outlet body to form water spray of granular and mist shape with skirt edge. Since the area of the water passing holes of the water passing member 142 covered by the flow rate adjustment plate 143 is different, the instantaneous flow rate of the water outlet body is different. When the total area of the water passing holes of the water passing member 142 covered by the flow rate adjustment plate 143 is small, the water outlet body will have large instantaneous flow rate, and the diameter D of the water outlet skirt edge is large (e.g. D2 as shown in the drawing). When the total area of the water passing holes of the water passing member 142 covered by the flow rate adjustment plate 143 is large, the water outlet body will have small instantaneous flow rate, and the diameter D of the water outlet skirt edge is small (e.g. D1 as shown in the drawing).

The water passing member 142 is sleeved on the first rotary shaft 1412 by the first through hole 1420 arranged at the axis of the water passing member 142. In one embodiment, the areas of the first water passing hole 1421 and the second water passing hole 1422 are different. Preferably, the areas of the first water passing hole 1421 and the second water passing hole 1422 are respectively defined as S1 and S2. Preferably, 4*S2≥S1≥1.5*S2. The shape of the first water passing hole 1421 and the second water passing hole 1422 may be square, circle, oval, rectangle, triangle and other regular shapes, which is not limited herein. The water passing member 142 further includes a plurality of positioning columns 1423 which are sleeved in the water outlet holes 1410 for providing water spray of granular and mist shape. In other embodiment, the number of the first water passing hole 1421 and the number of the second water passing hole 1422 are different, thus the total area of the first water passing hole 1421 and the total area of the second water passing hole 1422 are different.

The flow rate adjustment plate 143 is sleeved on the first rotary shaft 1412 through its rotary axis 1430. The flow rate adjustment plate 143 may have a regular or irregular geometrical shape. In one embodiment, the flow rate adjustment plate 143 is a semi-circular plate structure which is provided with two symmetrically arranged notches 1431. During the rotation of the notches 1431, the flow rate of the water passing member 142 is adjusted by adjusting the overlapping area with the first water passing hole 1421 and the second water passing hole 1422.

Figure 14:
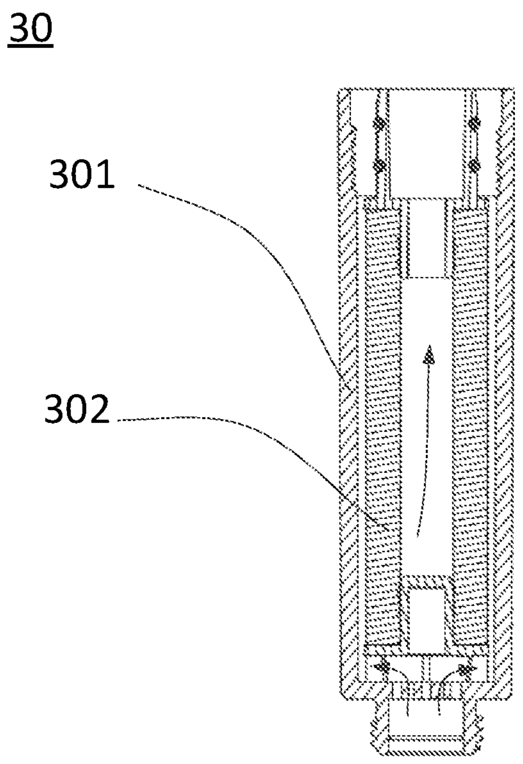
FIG. 14 is a structural schematic diagram of a handle with filtering function of the shower head with automatically resettable spray gun according to one embodiment of the present disclosure.
Figure 15:
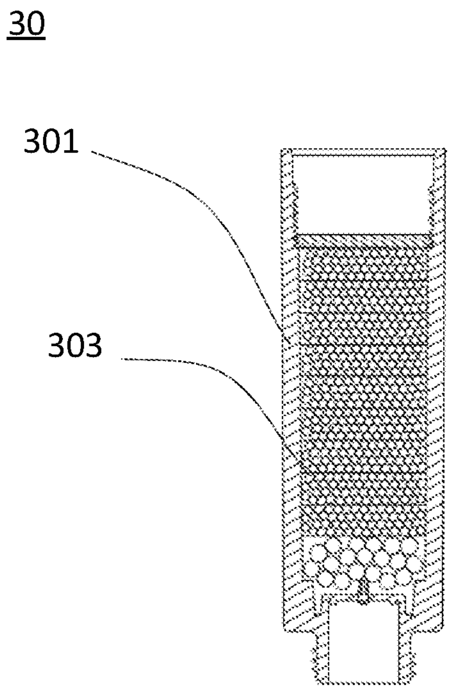
FIG. 15 is a structural schematic diagram of a handle with filtering function of the shower head with automatically resettable spray gun according to another embodiment of the present disclosure.

Referring to FIGS. 14-15, FIG. 14 shows a schematic diagram of the handle 30 having filtering function provided by one embodiment of the present disclosure. The handle 30 includes a casing 301 and a first filter core 302 arranged in the casing 301. The first filter core 302 is a replaceable structure. The first filter core 302 is a cylindrical structure, water flows into the filter core 302 from two sides of the cylindrical structure to get filtered and flows out from the middle.

FIG. 15 shows a schematic diagram of the handle 30 having filtering function provided by another embodiment of the present disclosure. The handle 30 includes a casing 301 and a second filter core 303 arranged in the casing 301. The second filter core 303 is a replaceable structure. The second filter core 303 has a layered structure, water flows in from one end of the layered structure and flows out from another end of the layered structure.

Figure 16:
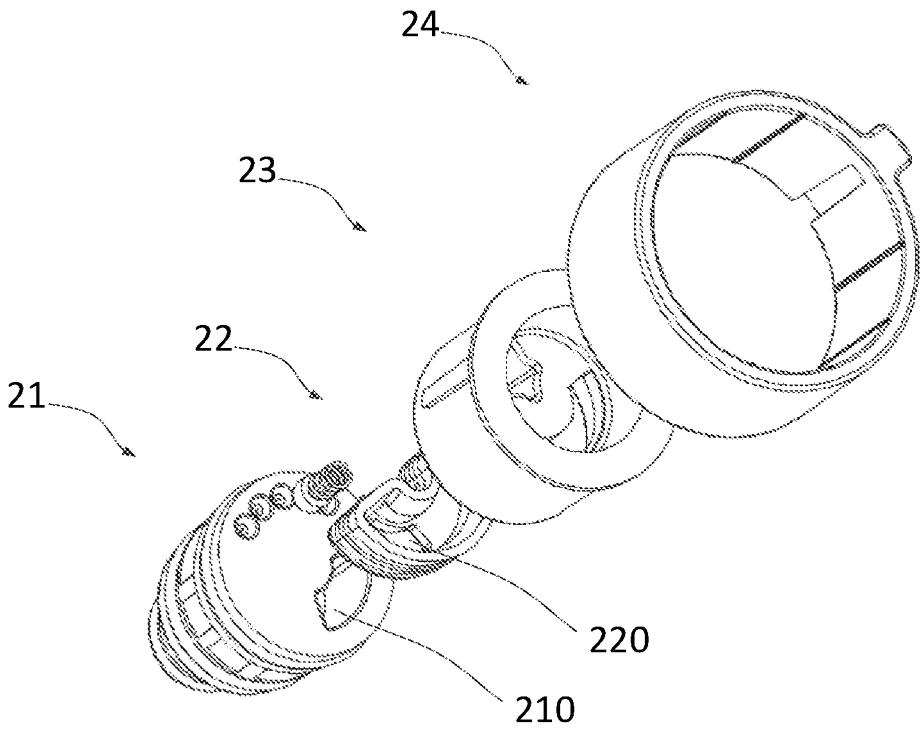
FIG. 16 is a structural schematic diagram of a flow rate switching mechanism of the shower head with automatically resettable spray gun according to another embodiment of the present disclosure.
Figure 17:
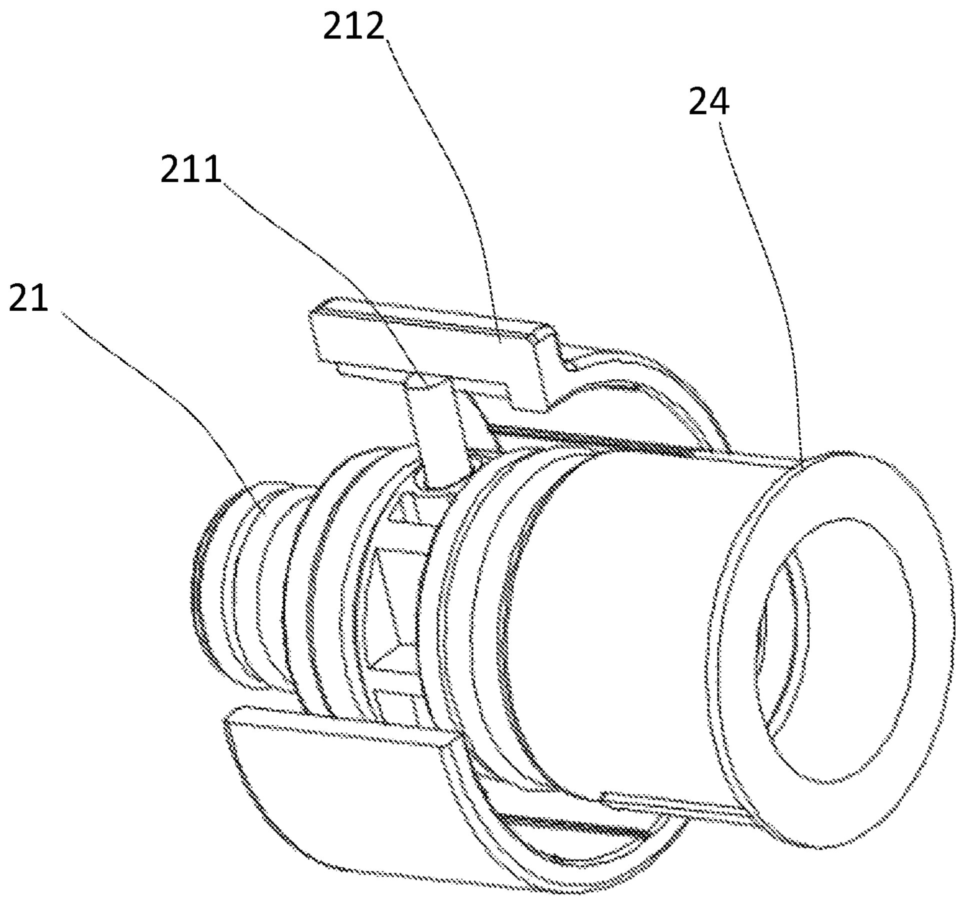
FIG. 17 is a schematic diagram showing an assembled structure of the flow rate switching mechanism of the shower head with automatically resettable spray gun according to another embodiment of the present disclosure.

Referring to FIGS. 16-17, the flow rate switching mechanism 20 provided by one embodiment of the present disclosure includes:

a switching ring 24;

a fixation seat 23 sleeved in the switching ring 24;

a sealing rubber cup 22 arranged in the fixation seat 23, wherein the sealing rubber cup 22 is provided with a first water passing port 220;

a switching shaft 21 arranged at the bottom of the fixation seat 23, wherein the switching shaft 21 is provided with a second water passing port 210 corresponding to the first water passing port 220, and a toggle shaft 211, wherein one end of the toggle shaft 211 is fixedly connected to the switching shaft 21, another end of the toggle shaft 211 contacts the switching ring 24.

Rotation of the switching ring 24 can drive the toggle shaft 211 to cause the switching shaft 21 to rotate relative to the sealing rubber cup 22, so as to control the flow rate of inflow water. Specifically, when the second water passing port 210 of the switching shaft 21 completely overlaps with the first water passing port 220 of the sealing rubber cup 22, the highest flow rate can be achieved; when the second water passing port 210 of the switching shaft 21 completely misaligned with the first water passing port 220 of the sealing rubber cup 22, the lowest flow rate can be achieved.

The above description merely shows preferred embodiments of the present disclosure and are not intended to limit the invention. For those of ordinary skill in the art, the invention may have various changes and variations. Any modification, equivalent substitution, improvement, and so on made within the spirit and principles of the invention shall be included in the scope of protection of the invention.

What is claimed is:

1. A shower head with automatically resettable spray gun, comprising:

a shower head body, wherein the shower head body includes a water passage switching mechanism, a shower head, and a spray gun head, the shower head and the spray gun head respectively communicates with the water passage switching mechanism; wherein the water passage switching mechanism includes:

a water passing member, wherein the water passing member includes a water inlet, a water passage switching cavity communicating with the water inlet, a shower head water passage, and a spray gun water passage, the shower head water passage and the spray gun water passage respectively communicates with the water passage switching cavity; and a water passage switching unit arranged in the water passage switching cavity, wherein the water passage switching unit includes a button arranged at the water passing member by hinge joint, a switching link rod arranged at a lower portion of the button, and an elastic member connected between the switching link rod and the water passage switching cavity; in an initial water inflow state, the water passage switching cavity communicates the shower head water passage and the water inlet and the switching link rod blocks off the spray gun water passage; by pressing the button, the switching link rod is driven to move and thus blocking off the shower head water passage, and the water passage is switched to a state where the water passage switching cavity communicates with the spray gun water passage, at this time, the elastic member is in a compressed state, and the state is retained under the action of water pressure; when water inflow is finished, since the water pressure is removed, the water passage is automatically switched and reset to the initial state under the action of the elastic member;

wherein the shower head body further comprises a water outlet mechanism which provides water spray of granular and mist shape, the water outlet mechanism communicates with the shower head water passage;

the water outlet mechanism comprises: a water outlet body, wherein an end surface of the water outlet body is provided with a plurality of water outlet holes for providing the water spray of granular and mist shape, a first rotary shaft is arranged at a center of the water outlet body, and an inner sidewall of the water outlet body is provided with inner gear teeth;

a water passing member sleeved on the first rotary shaft, wherein the water passing member is provided with a first water passing hole and a second water passing hole;

a flow rate adjustment plate, wherein the flow rate adjustment plate is sleeved on the first rotary shaft and is attached with the water passing member, by rotating the flow rate adjustment plate, a covered area of the first water passing hole and the second water passing hole can be adjusted, such that the flow rate of the water passing member can be adjusted, the flow rate adjustment plate is provided with a second rotary shaft;

a first gear sleeved on the second rotary shaft, wherein the first gear is engaged with the inner gear teeth; and an impeller sleeved on the first rotary shaft, wherein the impeller 145 includes second gear arranged around an axis of the impeller, the second gear is engaged with the first gear.

2. The shower head with automatically resettable spray gun according to claim 1, wherein the water passage switching unit further comprises:

a fixation seat, wherein the switching link rod is partially arranged in the fixation seat and can move up and down in the fixation seat; and a first sealing rubber ring arranged on the switching link rod for blocking off the spray gun water passage or the shower head water passage in a switching process.

3. The shower head with automatically resettable spray gun according to claim 2, wherein a circumference of a bottom portion of the switching link rod is further provided with an engagement groove for receiving the first sealing rubber ring.

4. The shower head with automatically resettable spray gun according to claim 1, wherein areas of the first water passing hole and the second water passing hole are different.

5. The shower head with automatically resettable spray gun according to claim 4, wherein the areas of the first water passing hole and the second water passing hole are respectively defined as S1 and S2, and $4*S2 \geq S1 \geq 1.5*S2$.

6. The shower head with automatically resettable spray gun according to claim 1, wherein the water passing member further comprises a plurality of positioning columns which are sleeved in the water outlet holes for providing the water spray of granular and mist shape.

7. The shower head with automatically resettable spray gun according to claim 1, wherein the shower head body further comprises a handle, the handle includes a casing and a filter core arranged in the casing.

8. A shower head with automatically resettable spray gun, comprising:

a shower head body, wherein the shower head body includes a water passage switching mechanism, a shower head, and a spray gun head, the shower head and the spray gun head respectively communicates with the water passage switching mechanism; wherein the water passage switching mechanism includes:

a water passing member, wherein the water passing member includes a water inlet, a water passage switching cavity communicating with the water inlet, a shower head water passage, and a spray gun water passage, the shower head water passage and the spray gun water passage respectively communicates with the water passage switching cavity; and a water passage switching unit arranged in the water passage switching cavity, wherein the water passage switching unit includes a button arranged at the water passing member by hinge joint, a switching link rod arranged at a lower portion of the button, and an elastic member connected between the switching link rod and the water passage switching cavity; in an initial water inflow state, the water passage switching cavity communicates the shower head water passage and the water inlet and the switching link rod blocks off the spray gun water passage; by pressing the button, the switching link rod is driven to move and thus blocking off the shower head water passage, and the water passage is switched to a state where the water passage switching cavity communicates with the spray gun water passage, at this time, the elastic member is in a compressed state, and the state is retained under the action of water pressure; when water inflow is finished, since the water pressure is removed, the water passage is automatically switched and reset to the initial state under the action of the elastic member;

further comprising: a flow rate switching mechanism, wherein the flow rate switching mechanism comprises:

a switching ring;

a fixation seat sleeved in the switching ring;

a sealing rubber cup arranged in the fixation seat, wherein the sealing rubber cup is provided with a first water passing port;

a switching shaft arranged at the bottom of the fixation seat, wherein the switching shaft is provided with a second water passing port corresponding to the first water passing port, and a toggle shaft, wherein a first end of the toggle shaft is fixedly connected to the switching shaft, a second end of the toggle shaft contacts the switching ring.

* * * * *